UNITED STATES PATENT OFFICE.

THOMAS H. LA ROCHE, OF LOCKPORT, NEW YORK.

IMPROVEMENT IN LUBRICATING COMPOUNDS.

Specification forming part of Letters Patent No. 177,525, dated May 16, 1876; application filed April 7, 1876.

*To all whom it may concern:*

Be it known that I, THOMAS H. LA ROCHE, of Lockport, in the county of Niagara and State of New York, have invented a new and valuable Improvement in Lubricating Compounds; and I do hereby declare that the following is a full, clear, and exact description of the same.

My invention is a lubricating compound, and consists in its composition of matter, and the process by which it is made, as follows:

First, take of kerosene-oil about sixteen fluid-ounces, of bees-wax about four ounces, and thoroughly dissolve the latter in the former, by the aid of sufficient heat. Then add about eight ounces of best quality of plumbago, and while the above is hot mix the whole thoroughly. Finally, as the last step in this first stage of the process, and while the said mixture is at about 160° Fahrenheit add about eighty fluid ounces of either crude petroleum or dead-oil, and then cool the mixture down to about 85° Fahrenheit, keeping it constantly stirred, to prevent any precipitation.

Second, in the meantime, while the said first stage of the process is going on, have mixed about four ounces of salts of tartar in about thirty-two fluid ounces of water, and gradually mix this solution with the aforesaid first mixture. The result of the said process so far is a thorough solution of the bees-wax and the plumbago held perfectly in suspension; but the said mixture is still imperfect, being a sluggish semi-fluid, grayish in color, and very liable to harden or congeal at even a high degree of temperature.

Therefore, a third stage in said process is necessary, as follows: Finally, pour into the above imperfect mixture about eight fluid-ounces of crude glycerine, and, after stirring the whole together for a few minutes, a perfectly fluid and black lubricating compound is the result.

It will be remarked that, upon first pouring in the glycerine, the mixture turns into a liver-colored jelly; but in a very few moments, by stirring, it becomes a naturally-colored and perfectly-lubricating fluid. Furthermore, the proportions of any or all the foregoing ingredients may be somewhat varied without changing the principle of my composition.

The beneficial results in the use of the above compound are the perfect preservation of its easily-flowing character at even a very low degree of temperature, say 15° Fahrenheit, and yet a perfectly oily lubricating power in the heats of summer. Therefore,

What I claim as my invention, and desire to secure by Letters Patent, is—

The lubricating compound, composed of kerosene-oil, bees-wax, plumbago, crude petroleum or dead-oil, salts of tartar, water, and glycerine, in the proportions substantially named, and prepared by the process herein described, substantially as and for the purposes specified.

In testimony that I claim the above I have hereunto subscribed my name in the presence of two witnesses.

THOMAS H. LA ROCHE.

Witnesses:
CHAS. B. B. M. STEELE,
JAMES A. WILKES.